United States Patent
Zhou et al.

(10) Patent No.: US 9,080,106 B2
(45) Date of Patent: Jul. 14, 2015

(54) OXIDE LUMINESCENT MATERIALS AND PREPARATION METHODS THEREOF

(75) Inventors: Mingjie Zhou, Shenzhen (CN); Xinshu Lu, Shenzhen (CN); Wenbo Ma, Shenzhen (CN)

(73) Assignee: OCEAN'S KING LIGHTING SCIENCE & TECHNOLOGY CO., LTD., Shenzhen (CN)

( * ) Notice: Subject to any disclaimer, the term of this patent is extended or adjusted under 35 U.S.C. 154(b) by 257 days.

(21) Appl. No.: 13/809,252

(22) PCT Filed: Jul. 12, 2010

(86) PCT No.: PCT/CN2010/075108
§ 371 (c)(1),
(2), (4) Date: Jan. 9, 2013

(87) PCT Pub. No.: WO2012/006771
PCT Pub. Date: Jan. 19, 2012

(65) Prior Publication Data
US 2013/0105733 A1  May 2, 2013

(51) Int. Cl.
*C09K 11/79* (2006.01)
*C09K 11/87* (2006.01)
*C09K 11/02* (2006.01)
*C09K 11/77* (2006.01)
*B82Y 30/00* (2011.01)

(52) U.S. Cl.
CPC ............ *C09K 11/873* (2013.01); *C09K 11/025* (2013.01); *C09K 11/7787* (2013.01); *C09K 11/87* (2013.01); *B82Y 30/00* (2013.01); *Y10S 977/773* (2013.01); *Y10S 977/81* (2013.01)

(58) Field of Classification Search
USPC .................................... 252/301.4 F, 301.4 R
See application file for complete search history.

(56) References Cited

U.S. PATENT DOCUMENTS

| 2003/0222248 A1* | 12/2003 | McClellan et al. ..... 252/301.4 F |
| 2013/0119313 A1* | 5/2013 | Zhou et al. .............. 252/301.4 F |

FOREIGN PATENT DOCUMENTS

| CN | 101074374 | 11/2007 |
| JP | 2002-80847 | * 2/2002 |

OTHER PUBLICATIONS

International Search Report of PCT/CN2010/075108, dated Apr. 28, 2011 (6 pages total).
Min et al., "Au@$Y_2O_3$:$Eu^{3+}$rare earth oxide hollow sub-microspheres with encapsulated gold nanoparticles and their optical properties," Solid State Sciences, 2009, vol. 11, pp. 96-101.
Aslan et al., "Fluorescent core-shell Ag@$SiO_2$ nanocomposites for metal-enhanced fluorescence and single nanoparticle sensing platforms," J. Am. Chem. Soc., 2007, vol. 129, No. 6, pp. 1524-1525.

* cited by examiner

*Primary Examiner* — Carol M Koslow
(74) *Attorney, Agent, or Firm* — Hamre, Schumann, Mueller & Larson, P.C.

(57) ABSTRACT

Oxide luminescent materials and preparation methods thereof are provided. The said luminescent materials are represented by the general formula: a$Re_2O_3$.b$SiO_2$.c$Eu_2O_3$.dM, wherein Re is at least one selected from Gd and Y, M is selected from metal nano-particles, (a+c):b=0.5-5, d:b=5×$10^{-5}$-5×$10^{-3}$, c:(a+c)=0.02-0.1. Compared to the oxide luminescent materials in the art, the said luminescent materials have higher luminescent intensity.

10 Claims, 4 Drawing Sheets

US 9,080,106 B2

OXIDE LUMINESCENT MATERIALS AND PREPARATION METHODS THEREOF

TECHNICAL FIELD

The present invention relates to the technical field of luminescent materials, particularly, to an luminescent material containing oxides of rare earth elements and the preparation method thereof.

BACKGROUND

Rare earth luminescent materials have excellent energy conversion function and exhibit superior luminescent properties because of their unique electronic shell structure, and currently they have become important photoelectric functional materials. The rare earth luminescent materials are widely used in high-definition display such as cathode ray tubes (CRT), plasma display panels (PDP), field emission devices (FED) and the like. Wherein FED is a low-voltage and high-current device, in recent years, it has received much concern due to its advantages of low operating voltage, low power consumption, no deflection coil, X-ray radiation free, anti-radiation and magnetic interference and the like. A field emission light source with high brightness, high quality of color rendering may be obtained by using a luminescent material excited by field emission cathode ray, and the field emission light source may be applied to the fields of professional lighting, display, signal indication as well as ordinary lighting and the like.

Currently, most of the luminescent materials for FED are made on the base of conventional phosphor powder for CRT, such as ZnS:Ag,Cl, $SrGa_2S_4$:Ce, $SrGa_2S_4$:Eu, $Y_2O_2S$:Eu, $Y_2SiO_5$:Ce, $ZnGa_2O_4$:Mn, $Y_2SiO_5$:Eu and $Y_2O_3$:Eu or the like, and some improvement has been made thereto. However, the working condition of the FED and that of the CRT are different, wherein the working voltage of CRT is high, is 15-30 kV, and the working voltage of FED is relatively lower, is generally below 10 kV. In order to obtain the potential advantages in the aspects of brightness, response time, working temperature range, energy consumption and the like, a series of conditions such as the brightness, luminous color, conductivity, stability, lifetime and luminous efficiency and the like of the phosphor powder for FED are required. And the exiting sulfide, oxysulfide and oxide phosphors have some deficiencies, although the phosphor powder containing sulfur has a high brightness, the stability thereof is poor; although the oxide has good stability, the luminous brightness thereof is not as good as sulfide.

SUMMARY

A technical problem solved by the present invention is to provide an oxide luminescent material with enhanced luminous intensity and the preparation method thereof.

An oxide luminescent material containing a luminescent substrate and an activator and metal nano-particles, wherein the activator and the metal nano-particles are doped in the luminescent substrate, the chemical composition of the luminescent substrate is $aRe_2O_3.bSiO_2$, the activator is $Eu_2O_3$, and the chemical composition of the luminescent material is $aRe_2O_3.bSiO_2.cEu_2O_3.dM$, wherein Re is Gd, Y or the combination thereof, M is a metal nano-particle, and the relationship of a, b, c, and d is: (a+c):b=0.5-5, d:b=$5\times10^{-5}$-$5\times10^{-3}$, c:(a+c)=0.02-0.1.

And a preparation method of an oxide luminescent material, comprising:

a metal nano-particle sol is obtained;

the metal nano-particle sol is added into a mixture of alcohol and water, the pH is adjusted to 2-6, and a tetraethyl orthosilicate (TEOS) is added in such an amount that the ratio of the metal to the TEOS is in the range of $5\times10^{-5}$:1-$5\times10^{-3}$:1, and the mixture is stirred in water bath at the temperature of 25° C. to 60° C. to obtain a mixed silica sol;

with the molar ratio of one or both selected from the group consisting of yttrium nitrate and gadolinium nitrate to europium nitrate being in the range of 0.98:0.02-0.9:0.1, a mixed nitrate solution is prepared, and the mixed nitrate solution is added into the mixed silica sol in such an amount that the ratio of total rare earth ions to TEOS is in the range of 0.5:1-5:1, after stirring, an oxalic acid solution is added dropwise, after another stirring, the pH is adjusted to 7-12, and the mixture is stirred to obtain an oxalate precursor solution;

the oxalate precursor solution is filtered, washed and dried;

the dried product is calcined at 1000-1300° C. for 4 to 12 hours to obtain the oxide luminescent material with the chemical composition of $aRe_2O_3.bSiO_2.cEu_2O_3.dM$, wherein Re is Gd, Y or the combination thereof, M is a metal nano-particle, and the relationship of a, b, c, and d is: (a+c):b=0.5-5, d:b=$5\times10^{-5}$-$5\times10^{-3}$, c:(a+c)=0.02-0.1.

In the above oxide luminescent material, by means of introducing metal nano-particles into the oxide matrix activated by europium ion, the interaction between the metal and luminescent substrate and activator, and the surface plasma effect produced by the metal nano-particles, the luminous intensity of the oxide luminescent material is significantly enhanced, meanwhile the light emitted by the oxide luminescent material under the stimulation of cathode ray turns into yellow green light from red light.

BRIEF DESCRIPTION OF THE DRAWINGS

The present invention will be described in detail with reference to the following Figures and embodiments, wherein.

DETAILED DESCRIPTION OF THE PREFERRED EMBODIMENTS

Figure 1:
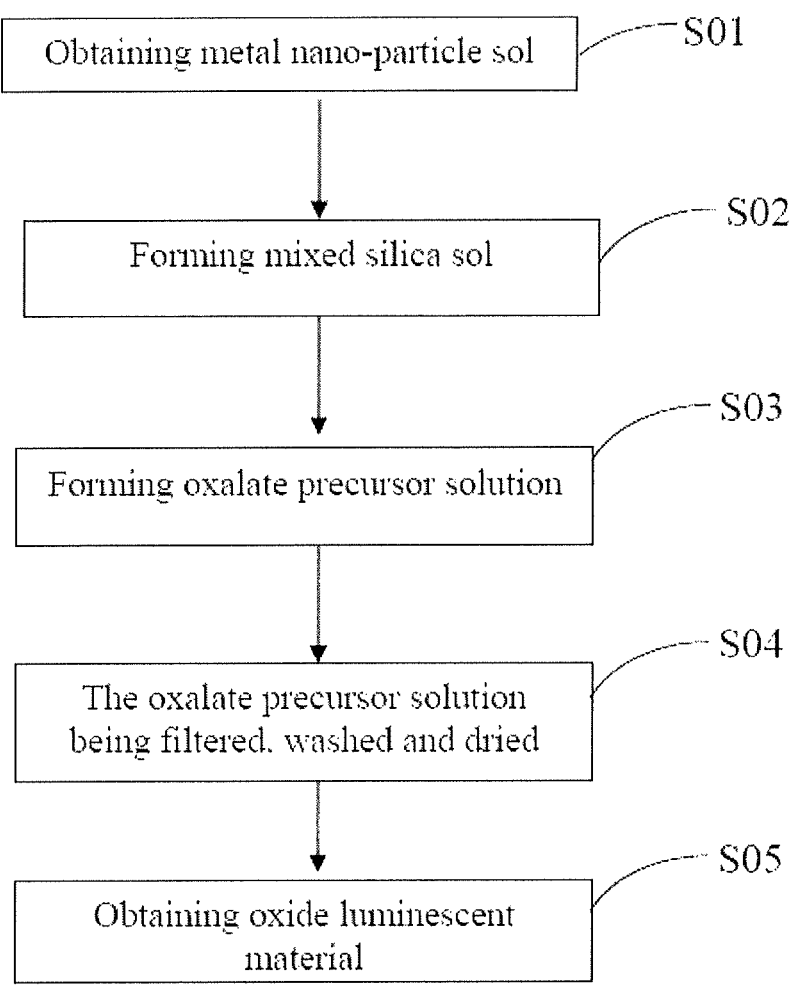
FIG. 1 is a flow chart of preparation method of the oxide luminescent material according to the embodiments of the present invention.

Objects, embodiments and advantages of the present invention will be explained below in detail with reference to the embodiments. However, it is to be appreciated that the following description of the embodiments is merely exemplary in nature and is no way intended to limit the invention.

An oxide luminescent material containing a luminescent substrate and an activator and metal nano-particles is provided in the embodiments according to the present invention, wherein the activator and metal nano-particles are doped in the luminescent substrate, the chemical composition of the luminescent substrate is $aRe_2O_3 \cdot bSiO_2$, the activator is $Eu_2O_3$, and the chemical composition of the luminescent material is $aRe_2O_3 \cdot bSiO_2 \cdot cEu_2O_3 \cdot dM$, wherein Re is Gd, Y or the combination thereof, M is a metal nano-particle, and the relationship of a, b, c, and d is: (a+c):b=0.5-5, d:b=$5 \times 10^{-5}$-$5 \times 10^{-3}$, c:(a+c)=0.02-0.1.

In the luminescent material of $aRe_2O_3 \cdot bSiO_2 \cdot cEu_2O_3 \cdot dM$, $Eu_2O_3$ plays the role of activator and the activating ion thereof is $Eu^{3+}$, thus when the luminescent material is in the state of solution, the activating ion thereof may be in the form of free $Eu^{3+}$. By means of the function of metal nano-particle, the light emitting of the luminescent material is enhanced under the cathode ray stimulation, and the emitting light thereof turns into yellow green light from red light. As shown in the above chemical formula, the relationship between a, b, and c is: (a+c):b=0.5-5, c:(a+c)=0.02-0.1; preferably, the relationship thereof is: (a+c):b=1-4, c:(a+c)=0.04-0.08.

The metal nano-particles can be, but not limited to, one or more selected from the group consisting of Ag, Au, Pt, Pd. As shown in the above chemical formula, the relative amount ratio of the metal nano-particles to the silica (d:b) is $5 \times 10^{-5}$-$5 \times 10^{-3}$, preferably, d:b=$1 \times 10^{-5}$-$5 \times 10^{-4}$. In this content, the metal nano-particles are uniformly discretely distributed in the luminescent substrate.

In the structure of the above oxide luminescent material, when the light is emitted, as shown in the cathodoluminescence spectrum of the non metal doped $aRe_2O_3 \cdot bSiO_2 \cdot cEu_2O_3$, in addition to the strongest emission peak at the position of 611 nm, there is also light emitting in the blue green band, such as there are obvious emission peaks at 536 nm and 587 nm for gadolinium oxide, there are obvious emission peaks at the positions around 534 nm, 582 nm, 588 nm for yttrium oxide, and these emission peaks are a little weaker than the emission peak at 611 nm, thus in this case the emitting light of $aRe_2O_3 \cdot bSiO_2 \cdot cEu_2O_3$ is red. After doped with metal, there is no change for the peak position of light emitting of $aRe_2O_3 \cdot bSiO_2 \cdot cEu_2O_3 \cdot dM$ compared to that of no-metal doped $aRe_2O_3 \cdot bSiO_2 \cdot cEu_2O_3$ (as shown in the Figures), and in addition to the light emitting of the oxide is significantly enhanced at 611 nm, it is especially enhanced in the blue green band after metal doped, such as the luminous intensity of the gadolinium oxide in the green light band (e.g. 536 nm) is substantially the same as that of the gadolinium oxide at 611 nm of red light, thus in this case the emitting light of $aRe_2O_3 \cdot bSiO_2 \cdot cEu_2O_3 \cdot dM$ is yellow green. The specific comparison of luminous intensity of the oxide luminescent material and that of non metal doped luminescent material is described in detail in the following Examples 1-5.

In the above oxide luminescent material, by means of introducing metal nano-particles into the oxide matrix activated by europium ion, the interaction between the metal and luminescent substrate and activator, and the surface plasma effect produced by the metal nano-particles, the luminous intensity of the oxide luminescent material is significantly enhanced, meanwhile the light emitted by the oxide luminescent material under the stimulation of cathode ray turns into yellow green light from red light.

With reference to FIG. 1, the flow chart of preparation method of the oxide luminescent material according to the embodiments of the present invention is shown, wherein the preparation method comprises:

S01, a metal nano-particle sol is obtained;

S02, a mixed silica sol is obtained: the metal nano-particle sol is added into a mixture of alcohol and water, the pH is adjusted to 2-6, and a tetraethyl orthosilicate (TEOS) is added in such an amount that the ratio of the metal to the TEOS is in the range of $5 \times 10^{-5}$:1-$5 \times 10^{-3}$:1, and the mixture is stirred in water bath at the temperature of 25° C. to 60° C. to obtain a mixed silica sol;

S03, an oxalate precursor solution is obtained: with the molar ratio of one or both selected from the group consisting of yttrium nitrate and gadolinium nitrate to europium nitrate being in the range of 0.98:0.02-0.9:0.1, a mixed nitrate solution is prepared, and the mixed nitrate solution is added into the mixed silica sol in such an amount that the ratio of total rare earth ions to TEOS is in the range of 0.5:1-5:1, after stirring, an oxalic acid solution is added dropwise, after another stirring, the pH is adjusted to 7-12, and the mixture is stirred to obtain an oxalate precursor solution;

S04, the obtained oxalate precursor solution is filtered, washed and dried;

S05, an oxide luminescent material is obtained: the dried product is calcined at 1000-1300° C. for 4 to 12 hours to obtain the oxide luminescent material with the chemical composition of $aRe_2O_3 \cdot bSiO_2 \cdot cEu_2O_3 \cdot dM$, wherein Re is Gd, Y or the combination thereof, M is a metal nano-particle, and the relationship of a, b, c, and d is: (a+c):b=0.5-5, d:b=$5 \times 10^{-5}$-$5 \times 10^{-3}$, c:(a+c)=0.02-0.1.

The metal nano-particle sol in step S01 may be provided directly, it is commercially available, and also it can be obtained by preparation. The metal nano-particle has a particle size that is 5 nm-10 nm. When prepared, the preparation process of the metal nano-particle sol is as follows:

1) preparation of a dissoluble solution of the metal compound; the detail procedure is as follows: a suitable amount of metal compound is weighed and dissolved into a solvent to give a solution then the solution is diluted to a certain concentration, the concentration may be, for example, $2 \times 10^{-4}$ mol/L-$1 \times 10^{-3}$ mol/L; the metal compound is preferably one or more selected from the group consisting of silver nitrate, chlorauric acid, chloroplatinic acid, palladium chloride; the solvent is preferably selected from water and/or ethanol;

2) a hydrazine hydrate, or ascorbic acid or alkali metal borohydride is dissolved in a solvent to give a reductant solution; wherein the solvent is preferably water and/or ethanol; the concentration of the obtained reductant solution is in the range of $1\times10^{-3}$ mol/L-$1\times10^{-2}$ mol/L; and the corresponding mass of the reductant substance is substantially calculated in accordance with the required stoichiometrics for the reducing metal compound; the alkali metal borohydride may be, but not limited to, sodium borohydride or potassium borohydride and the like;

3) with stirring, an additive is dissolved in the dissoluble solution prepared in step 1), and the content of the additive in the final metal nano-particle sol is $5\times10^{-4}$ g/ml-$4\times10^{-3}$ g/ml; and the additive is preferably one or more selected from the group consisting of polyvinyl pyrrolidone (PVP), sodium citrate, cetyl trimethyl ammonium bromide, sodium lauryl sulfate, and sodium dodecyl sulfate;

4) with stirring, and the ratio of reductant to the metal ions being 0.5:1-4.8:1, the dissoluble solution containing additives and the reductant solution are mixed, and the mixture is stirred for 10 minutes-45 minutes to give a metal nano-particle sol; wherein the stirring is magnetic stirring.

Furthermore, to facilitate the later preparation together with silica sol, the metal nano-particle sol obtained in step 4) may be subjected to surface treatment, the detail procedure is: the metal nano-particle sol obtained in step 4) is diluted with deionized water to the concentration of $1\times10^{-6}$ mol/L-$5\times10^{-2}$ mol/L, and a certain volume of the metal nano-particle sol solution in this concentration is measured and a surface treatment agent is added and the mixture is stirred for 3 h-12 h, wherein the concentration of the surface treatment agent is 0.001 g/ml-0.01 g/ml. Wherein, for example, the volume of the measured metal nano-particle sol is 0.5-10 ml, and the amount of the added surface treatment surface is 0.01-0.20 g, and the two compounds may be mixed according to the above said ratio in practical application. The surface treatment agent is preferably polyvinylpyrrolidone.

In step S02, the preparation of the mixed silica solution comprises:

i) an alcohol/water mixture is prepared, wherein the volume ratio of water:alcohol is 1:5-2:1, and the alcohol may be ethanol or the like;

ii) the obtained metal nano-particle sol is added into the alcohol/water mixture in such an amount that the concentration of metal in the mixture is in the range of $1\times10^{-5}$ mol/L-$1\times10^{-3}$ mol/L, the pH was adjusted to 2-6, and then a TEOS was added in such an amount that the ratio of metal to TEOS is in the range of $5\times10^{-5}$:1-$5\times10^{-3}$:1, and the concentration of TEOS in the solution is in the range of 0.1 mol/L-0.5 mol/L, and then the mixture is stirred in a water bath at a temperature of 25° C. to 60° C. until a mixed silica sol is formed.

The detail procedure of Step S03 may include the following sub-steps:

(1) preparation of a mixed nitrate solution: the metal source compound for the preparation may be an oxide or nitrate of the metal. When using an oxide, an yttrium oxide and/or gadolinium oxide, europium oxide and the like are weighed and added to a nitric acid solution (concentrated nitric acid), then wetted with deionized water, after dissolved by heating, a mixed nitrate solution is prepared according to the ratio of the chemical formula, wherein the total concentration of all rare earth ions containing $Y^{3+}$ and/or $Gd^{3+}$ and $Eu^{3+}$ is 0.4 mol/L-1.8 mol/L, and the molar ratio of the total amount of yttrium oxide and/or gadolinium oxide to the amount of europium oxide is 0.98:0.02-0.9:0.1. When using directly nitrate as a metal resource compound for preparation, take a water as the solvent, a mixed nitrate solution containing $Eu(NO_3)_3$ and $Gd(NO_3)_3$ or a mixed nitrate solution containing $Eu(NO_3)_3$ and $Y(NO_3)_3$ or a mixed nitrate solution containing $Gd(NO_3)_3$, $Eu(NO_3)_3$, and $Y(NO_3)_3$ is prepared, wherein the molar ratio of total $Gd(NO_3)_3$:$Eu(NO_3)_3$ and/or $Y(NO_3)_3$:$Eu(NO_3)_3$ is 0.98:0.02-0.9:0.1, and the concentration of total rare earth ions of $Gd^{3+}$ and/or $Y^{3+}$, as well as $Eu^{3+}$ is 0.4 mol/L-1.8 mol/L.

(2) the mixed nitrate solution is added to the mixed silica sol in such an amount that the ratio of the amount of total rare earth metal ions to the amount of TEOS is in the range of 0.5:1-5:1, the mixture is stirred until uniformly;

(3) an oxalic acid solution is added dropwise to the solution system formed by step (2), after stirring, the pH was adjusted to 7-12 and then it is stirred to give an oxalate precursor solution. Specifically, an oxalic acid solution with a concentration of 0.5-3 mol/L is added dropwise to the mixed system containing mixed nitrate solution and mixed silica sol, and the dropwise addition time is in the range of 20-60 minutes, after the dropwise addition is finished the mixture is stirred for another 2-5 hours, and then the pH of the reaction system is adjusted to 7-12, and it is stirred for another 0.5-2 hours to obtain the said oxalate precursor solution.

The detail procedure of the step S04 is: the obtained oxalate precursor solution is washed with water of 70-100° C. and filtered and repeated for three times, then the filtered product is dried for 4-12 hours at a temperature of 80-110° C.

In Step S05, before calcination, the dried product is ground to uniformity, and then calcined at 1000-1300° C. for 4-12 hours to obtain the said oxide luminescent material. According to the ratio of raw materials in the above steps, the chemical composition of the finally obtained luminescent material is $aRe_2O_3 \cdot bSiO_2 \cdot cEu_2O_3 \cdot dM$, wherein Re is Gd, Y or the combination thereof, M is a metal nano-particle, and the relationship of a, b, c and d is: (a+c):b=0.5-5, d:b=$5\times10^{-5}$-$5\times10^{-3}$, c:(a+c)=0.02-0.1.

In the preparation procedure described above, a sol is obtained by a liquid phase synthesis process, and then it is added to an oxalic acid to conduct a sediment, and then the product is dried, calcined, to obtain an oxide luminescent material, the whole procedure is simple, low requirement for the equipments, and can reduce production cost. Moreover, as described above, in the preparation procedure, the silica sol is formed under the existence of the metal nano-particle sol, so that the metal nano-particles are uniformly discretely distributed in the luminescent substrate, also, the rare earth element nitrate solution and the mixed sol are uniformly mixed, and an oxalate precipitation is formed in a solution of oxalic acid, which facilitates all the components to mix uniformly, has better distribution, and benefits the interaction of the metal nano-particles with the rare earth element oxide, and enhances emission intensity.

The different compositions, the preparation methods and the characteristics of the oxide luminescent material will be explained in detail referring to following Examples.

EXAMPLE 1

I. Preparation of Pt Nano-Particle Sol 5.18 mg of chloroplatinic acid ($H_2PtCl_6 \cdot 6H_2O$) was weighed and dissolved in 15.2 ml of deionized water; after the chloroplatinic acid is completely dissolved, 20.0 mg of sodium citrate was weighed and dissolved in the aqueous chloroplatinic acid solution under magnetic stirring; 3.8 mg of sodium borohydride was weighed and dissolved in 10 ml of deionized water to obtain 10 ml of aqueous sodium borohydride solution in the concentration of $1\times10^{-2}$ mol/L; under magnetic stirring, with the ratio of the reducing agent to the metal ion being 4.8:1, 4.8 ml of aqueous sodium borohydride solution was added dropwise to the aqueous chloroplatinic acid solution, and the reaction was continued for another 45 min to obtain 20 ml of nano-particle sol containing $5\times10^{-4}$ mol/L of Pt.

II. Preparation of Pt Nano-Particle Doped Oxide Luminescent Material

With the volume ratio distilled water and absolute ethanol being 1:4, 3.6 ml of distilled water and 14.4 ml of absolute ethanol were thoroughly mixed, and 2 ml of above prepared Pt nano-particle sol was added that the Pt content in the mixture is $5\times10^{-5}$ mol/L; the pH of the mixture was adjusted to 2 with nitric acid, then 0.005 mol of TEOS was quickly added, thus the ratio of the amount of the metal to the TEOS was $2\times10^{-4}$:1, and the concentration of the TEOS in the solution was 0.25 mol/L, then it was stirred in water bath at 60° C. until a silica sol was formed, the resulted sol was marked as A1. With the ratio of the total amount of the $Gd^{3+}$ and $Eu^{3+}$ to the amount of TEOS being 5:1 and the molar ratio of $Gd^{3+}$:$Eu^{3+}$ being 0.98:0.02, 8.883 g of $Gd_2O_3$ and 0.175 g of $Eu_2O_3$ were weighed and dissolved in concentrated nitric acid to obtain 50 ml of mixture containing $Gd(NO_3)_3$ and $Eu(NO_3)_3$, the total concentration of $Gd^{3+}$ and $Eu^{3+}$ in the resulted solution was 0.5 mol/L; the obtained mixture of $Gd(NO_3)_3$ and $Eu(NO_3)_3$ was added to the solution of the previously obtained A1, it was magnetic stirred for 1 h, the obtained mixture was marked as B1. With the oxalic acid being excess of 1.1 times, 5.200 g of oxalic acid was weighed and dissolved in 13.75 ml of deionized water to give an oxalic acid solution in the concentration of 3 mol/L, and the oxalic acid solution was added dropwise to the solution of the previously obtained B1, the dropwise addition time was 35 min, after the dropwise addition was completed it was magnetic stirred for another 2 h, the pH of the reaction system was adjusted to 7 with ammonia solution, then it was magnetic stirred for another 2 h, and the obtained suspension was marked as C1. The C1 was washed with deionized water of 70° C. and filtered and repeated for three times, and the obtained filtered product was dried in an oven of 80° C. for 12 h; the dried material was calcined at 1000° C. for 12 hours, and the luminescent material with the composition of $4.9Gd_2O_3.SiO_2.0.1Eu_2O_3.2\times10^{-4}Pt$ was obtained.

Figure 2:
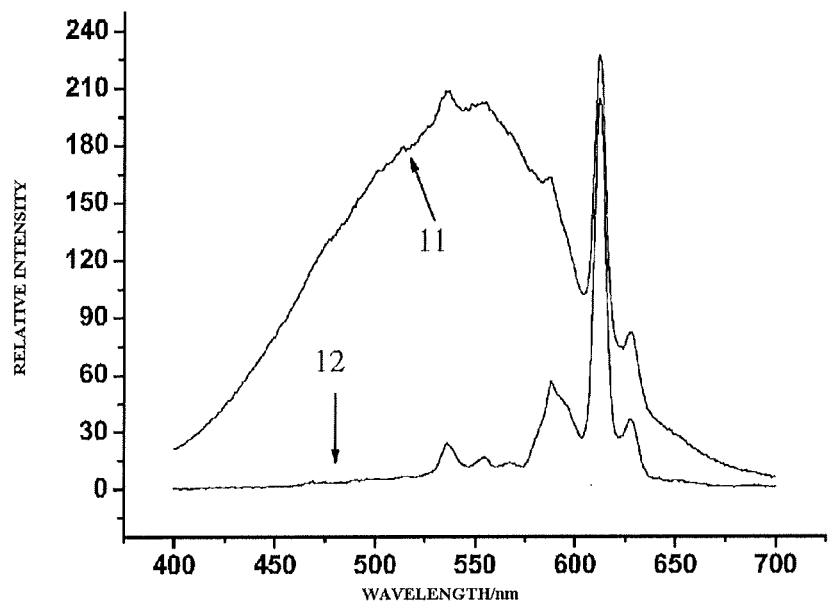
FIG. 2 shows a cathodoluminescence (CL) spectrum of the metal doped luminescent material of $4.9Gd_2O_3.SiO_2.0.1Eu_2O_3.2\times10^{-4}$Pt prepared in Example 1 stimulated by the cathode ray, and a cathodoluminescence spectrum of the non metal doped luminescent material of $4.9Gd_2O_3.SiO_2.0.1Eu_2O_3$ prepared in the same process as that of Example 1 stimulated by the cathode ray, and the test voltage in both spectra is 7 kV.

In FIG. 2, Graph 11 shows the cathodoluminescence spectra of the luminescent material of $4.9Gd_2O_3.SiO_2.0.1Eu_2O_3.2\times10^{-4}Pt$ prepared in this Example stimulated by the cathode ray, the CIE values thereof are X=0.3428, y=0.4270 and the emitting light is yellow green; while Graph 12 in FIG. 2 shows the cathodoluminescence spectra of the non metal doped luminescent material of $4.9Gd_2O_3.SiO_2.0.1Eu_2O_3$ prepared by the same method as that in this Example stimulated by the cathode ray, the CIE values thereof are X=0.5533, y=0.4090 and the emitting light is red yellow. This figure shows that the light emitting of the luminescent material of $4.9Gd_2O_3.SiO_2.0.1Eu_2O_3.2\times10^{-4}Pt$ is more significantly enhanced compared to that of the non metal doped luminescent material of $4.9Gd_2O_3.SiO_2.0.1Eu_2O_3$.

EXAMPLE 2

I. Preparation of Ag Nano-Particle Sol 17.0 mg of silver nitrate ($AgNO_3$) was weighed and dissolved in 19 ml of deionized water; after the silver nitrate was completely dissolved, 80 mg of sodium citrate was weighed and dissolved in the aqueous silver nitrate solution under magnetic stirring; a hydrazine hydrate solution was diluted to the concentration of $5\times10^{-2}$ mol/L and the volume was 10 ml; under magnetic stirring, with the amount ratio of the reducing agent to the metal ion being 0.5:1, 1 ml of hydrazine hydrate solution in $5\times10^{-2}$ mol/L was added to the aqueous silver nitrate solution once only, and the reaction was continued for another 30 min to give 20 ml of Ag nano-particles sol with silver content of $5\times10^{-3}$ mol/L.

II. Preparation of Ag Nano-Particle Doped Oxide Luminescent Material

With a volume ratio being 1:5, 6.0 ml of distilled water and 30 ml of absolute ethanol were thoroughly mixed, and 4 ml of above prepared Ag nano-particle sol was added, and the Ag content in the mixture was $5\times10^{-4}$ mol/L; the pH of the mixture was adjusted to 3 with nitric acid, then with the ratio of the amount of the metal to the TEOS being $5\times10^{-3}$:1, 0.004 mol of TEOS was quickly added, thereby the concentration of the TEOS in the solution was 0.1 mol/L, then it was stirred in water bath at 50° C. until a silica sol was formed, the resulted sol was marked as A2. With the ratio of the total amount of the $Y^{3+}$ and $Eu^{3+}$ to the amount of TEOS being 4:1, the molar ratio of $Y^{3+}$ to $Eu^{3+}$ being 0.95:0.05, 3.432 g of $Y_2O_3$ and 0.282 g of $Eu_2O_3$ were weighed and dissolved in a concentrated nitric acid, and 40 ml of the mixture containing $Y(NO_3)_3$ and $Eu(NO_3)_3$ was weighed, the total concentration of $Y^{3+}$ and $Eu^{3+}$ in the resulted solution was 0.4 mol/L; the obtained mixture of $Y(NO_3)_3$ and $Eu(NO_3)_3$ was added to the solution of the previously obtained A2, it was magnetic stirred for 2 h, the obtained mixture was marked as B2; then with the oxalic acid being excess of 1.2 times, 3.63 g of oxalic acid was weighed and dissolved in 28.8 ml of deionized water to give an oxalic acid solution in the concentration of 1 mol/L, and the oxalic acid solution was added dropwise to the solution of the previously obtained B2, the time of the dropwise addition was 25 min, after the dropwise addition was completed it was magnetic stirred for another 3 h, the pH of the reaction system was adjusted to 8 with ammonia solution, then it was magnetic stirred for another 1.5 h, the obtained suspension was marked as C2; the C2 was washed with deionized water of 80° C. and filtered and repeated for three times, and the obtained filtered product was dried in an oven of 90° C. for 8 h; the dried material was calcined at 1100° C. for 8 hours, and the luminescent material with the composition of $3.8Y_2O_3.SiO_2.0.2Eu_2O_3.5\times10^{-3}Ag$ was obtained.

Figure 3:
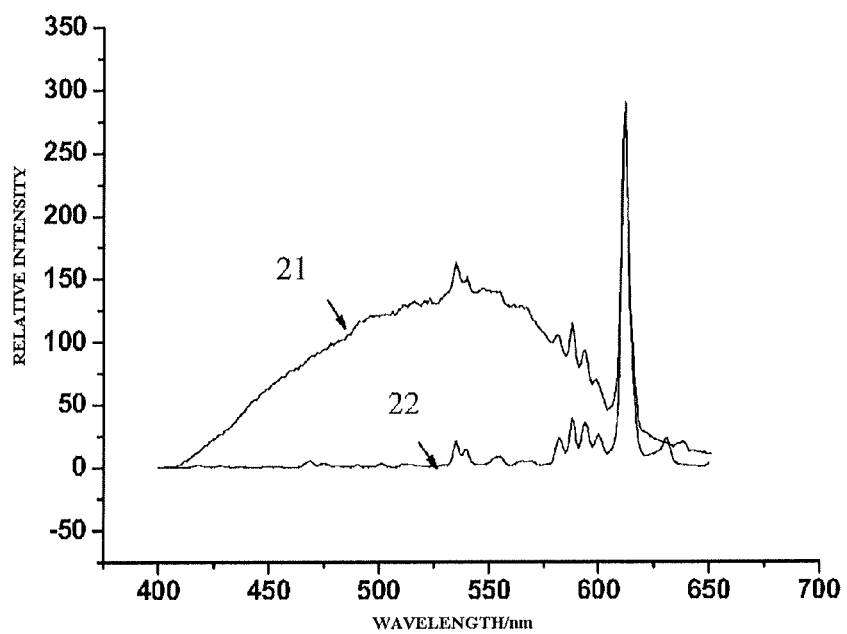
FIG. 3 shows a cathodoluminescence spectrum of the metal doped luminescent material of $3.8Y_2O_3.SiO_2.0.2Eu_2O_3.5\times10^{-3}$Ag prepared in Example 2 stimulated by the cathode ray, and a cathodoluminescence spectrum of the non metal doped luminescent material of $3.8Y_2O_3.SiO_2.0.2Eu_2O_3$ prepared in the same process as that of Example 2 stimulated by the cathode ray, and the test voltage in both spectra is 7 kV.

In FIG. 3, Graph 21 shows the cathodoluminescence spectra of the luminescent material prepared in this Example stimulated by the cathode ray, the CIE values thereof are X=0.3131, y=0.4322 and the emitting light is yellow green light; while Graph 22 in FIG. 3 shows the cathodoluminescence spectra of the non metal doped luminescent material of $3.8Y_2O_3.SiO_2.0.2Eu_2O_3$ prepared by the same method as that in this Example stimulated by the cathode ray, the CIE values thereof are X=0.5870, y=0.3791, and the emitting light is red light. This figure shows that the light emitting of the luminescent material of Graph 21 is more significantly enhanced compared to that of Graph 22 in FIG. 3.

EXAMPLE 3

I. Preparation of Ag Nano-Particle Sol 3.4 mg of silver nitrate ($AgNO_3$) was weighed and dissolved in 18.4 ml of anhydrous ethanol; after the silver nitrate was completely dissolved, 20 mg of PVP was weighed and dissolved in the ethanol solution of silver nitrate under magnetic stirring; 5.7 mg potassium borohydride was weighed and dissolved into 10 ml of anhydrous ethanol to obtain 10 ml of ethanol solution of potassium borohydride in a concentration of $1.5 \times 10^{-2}$ mol/L; under magnetic stirring, with the amount ratio of the reducing agent to the metal ion being 1.2:1, 1.6 ml of ethanol solution of potassium borohydride of $1.5 \times 10^{-2}$ mol/L was added to the ethanol solution of silver nitrate once only, and the reaction was continued for another 10 min to give 20 ml of Ag nano-particles sol with silver content of $1 \times 10^{-3}$ mol/L.

II. Preparation of Ag Nano-Particle Doped Oxide Luminescent Material

With the volume ratio being 1:2, 9 ml of distilled water and 18 ml of absolute ethanol were thoroughly mixed, and 3 ml of above prepared Ag nano-particle sol was added, thereby the Ag content in the mixture was $1 \times 10^{-4}$ mol/L; the pH of the mixture was adjusted to 4 with nitric acid, then with the ratio of the amount of the metal to the amount of TEOS being $2.5 \times 10^{-4}$:1, 0.012 mol of TEOS was quickly added, thereby the concentration of the TEOS in the solution was 0.4 mol/L, then it was stirred in water bath at 40° C. until a silica sol was formed, the resulted sol was marked as A3. With the ratio of the total amount of the $Gd^{3+}$ and $Eu^{3+}$ to the amount of TEOS being 1:1, and the molar ratio of $Gd^{3+}$ to $Eu^{3+}$ being 0.94:0.06, 4.094 g of $Gd_2O_3$ and 0.254 g of $Eu_2O_3$ were weighed and dissolved in a concentrated nitric acid to give 20 ml of the mixture containing $Gd(NO_3)_3$ and $Eu(NO_3)_3$, the total concentration of $Gd^{3+}$ and $Eu^{3+}$ in the resulted solution was 0.6 mol/L; the obtained mixture of $Gd(NO_3)_3$ and $Eu(NO_3)_3$ was added to the solution of the previously obtained A3, it was magnetic stirred for 2.5 h, the obtained mixture was marked as B3; then with the oxalic acid being excess of 1.3 times, 2.950 g of oxalic acid was weighed and dissolved in 11.7 ml of deionized water to give an oxalic acid solution in the concentration of 2 mol/L, and the oxalic acid solution was added dropwise to the solution of the previously obtained B3, the time of the dropwise addition was 30 min, after the dropwise addition was completed it was magnetic stirred for another 3.5 h, the pH of the reaction system was adjusted to 9 with ammonia solution, then it was magnetic stirred for another 1 h, the obtained suspension was marked as C3; the C3 was washed with deionized water of 90° C. and filtered and repeated for three times, and the obtained filtered product was dried in an oven of 90° C. for 8 h; the dried material was calcined at 1200° C. for 6 hours, and the luminescent material with the composition of $0.94Gd_2O_3 \cdot SiO_2 \cdot 0.06Eu_2O_3 \cdot 2.5 \times 10^{-4}Ag$ was obtained.

Figure 4:
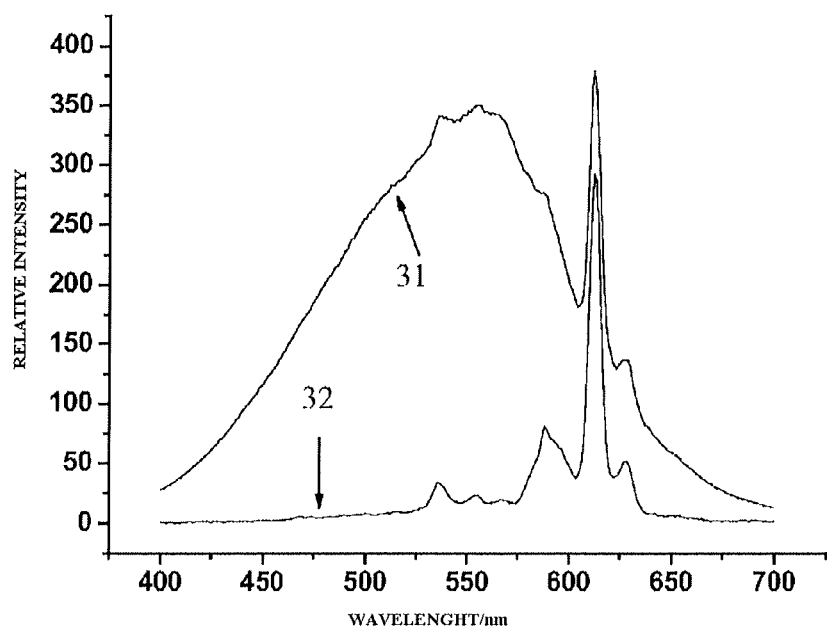
FIG. 4 shows a cathodoluminescence spectrum of the metal doped luminescent material of $0.94Gd_2O_3.SiO_2.0.06Eu_2O_3.2.5\times10^{-4}$Ag prepared in Example 3 stimulated by the cathode ray, and a cathodoluminescence spectrum of the non metal doped luminescent material of $0.94Gd_2O_3.SiO_2.0.06Eu_2O_3$ prepared in the same process as that of Example 3 stimulated by the cathode ray, and the test voltage in both spectra is 7 kV.

In FIG. 4, Graph 31 shows the cathodoluminescence spectra of the luminescent material of $0.94Gd_2O_3 \cdot SiO_2 \cdot 0.06Eu_2O_3 \cdot 2.5 \times 10^{-4}Ag$ prepared in this Example stimulated by the cathode ray, the CIE values thereof are X=0.3439, y=0.4454, and the emitting light is yellow green; while Graph 32 in FIG. 4 shows the cathodoluminescence spectra of the non metal doped luminescent material of $0.94Gd_2O_3 \cdot SiO_2 \cdot 0.06Eu_2O_3$ prepared by the same method as that in this Example stimulated by the cathode ray, the CIE values thereof are X=0.5509, y=0.4112, and the emitting light is red yellow. This figure shows that the light emitting of Graph 31 is more significantly enhanced compared to that of Graph 32 in FIG. 4.

EXAMPLE 4

I. Preparation of Au Nano-Particle Sol 4.12 mg of chloroauric acid ($AuCl_3 \cdot HCl \cdot 4H_2O$) was weighed and dissolved in 9 ml of deionized water; after the chloroauric acid was completely dissolved, 14 mg of sodium citrate and 6 mg of PVP were weighed and dissolved in the aqueous chloroauric acid solution under magnetic stirring; 17.6 mg of ascorbic acid was weighed and dissolved in 10 ml of deionized water to obtain 10 ml of aqueous ascorbic acid solution in a concentration of $1 \times 10^{-2}$ mol/L; under magnetic stirring, with the amount ratio of the reducing agent to the metal ion being 1:1, 1 ml of aqueous ascorbic acid solution of $1 \times 10^{-2}$ mol/L was added to the aqueous chloroauric acid solution, and the reaction was continued for another 30 min to give 10 ml of Au nano-particles sol with $1 \times 10^{-3}$ mol/L of Au.

II. Preparation of Au Nano-Particle Doped Oxide Luminescent Material

With the volume ratio being 1:2, 9 ml of distilled water and 18 ml of absolute ethanol were thoroughly mixed, and 3 ml of above prepared Au nano-particle sol was added, and the Au content in the mixture was $1 \times 10^{-4}$ mol/L; the pH of the mixture was adjusted to 5 with nitric acid, then with the ratio of the amount of the metal to the TEOS being $2 \times 10^{-4}$:1, 0.015 mol of TEOS was quickly added, and the concentration of the TEOS in the solution was 0.5 mol/L, then it was stirred in water bath at 55° C. until a silica sol was formed, the resulted sol was marked as A4. With the ratio of the total amount of the $Y^{3+}$ and $Eu^{3+}$ to the amount of TEOS being 0.5:1, the molar ratio of $Y^{3+}$ to $Eu^{3+}$ being 0.92:0.08, 1.588 g of $Y_2O_3$ and 0.211 g of $Eu_2O_3$ were weighed, and the $Y_2O_3$ and $Eu_2O_3$ were dissolved in a concentrated nitric acid to obtain 10 ml of mixture containing $Y(NO_3)_3$ and $Eu(NO_3)_3$, and the total concentration of $Y^{3+}$ and $Eu^{3+}$ in the resulted solution was 0.75 mol/L; the obtained mixture of $Y(NO_3)_3$ and $Eu(NO_3)_3$ was added to the solution of the previously obtained A4, and the obtained mixture was magnetic stirred for 3 h, it was marked as B4; then with the oxalic acid being excess of 1.4 times, 1.986 g of oxalic acid was weighed and dissolved in 10.5 ml of deionized water to give an oxalic acid solution in the concentration of 1.5 mol/L, and the oxalic acid solution was added dropwise to the solution of the previously obtained B4, the time of the dropwise addition was 20 min, after the dropwise addition was completed it was magnetic stirred for another 4 h, the pH of the reaction system was adjusted to 10 with ammonia solution, then it was magnetic stirred for another 1 h, the obtained suspension was marked as C4; the C4 was washed with deionized water of 80° C. and filtered and repeated for three times, and the obtained filtered product was dried in an oven of 100° C. for 6 h; the dried material was calcined at 1250° C. for 6 hours, and the luminescent material with the composition of $0.46Y_2O_3 \cdot SiO_2 \cdot 0.04Eu_2O_3 \cdot 2 \times 10^{-4}Au$ was obtained.

Figure 5:
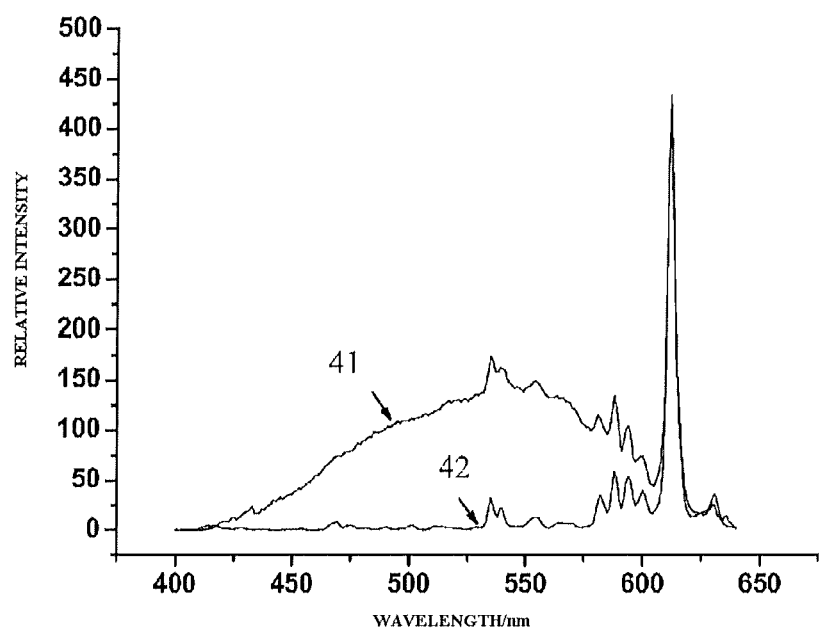
FIG. 5 shows a cathodoluminescence spectrum of the metal doped luminescent material of $0.46Y_2O_3 \cdot SiO_2 \cdot 0.04Eu_2O_3 \cdot 2 \times 10^{-4}Au$ prepared in Example 4 stimulated by the cathode ray, and a cathodoluminescence spectrum of the non metal doped luminescent material of $0.46Y_2O_3 \cdot SiO_2 \cdot 0.04Eu_2O_3$ prepared in the same process as that of Example 4 stimulated by the cathode ray, and the test voltage in both spectra is 7 kV.

In FIG. 5, Graph 41 shows the cathodoluminescence spectra of the luminescent material of $0.46Y_2O_3 \cdot SiO_2 \cdot 0.04Eu_2O_3 \cdot 2 \times 10^{-4}Au$ prepared in this Example stimulated by the cathode ray, the CIE values thereof are X=0.3396, y=0.4659, and the emitting light is yellow green light; while Graph 42 in FIG. 5 shows the cathodoluminescence spectra of the non metal doped luminescent material of $0.46Y_2O_3 \cdot SiO_2 \cdot 0.04Eu_2O_3$ prepared by the same method as that in this Example stimulated by the cathode ray, the CIE values thereof are X=0.5867, y=0.3793, and the emitting light is red light. This figure shows that the light emitting of the luminescent material of Graph 41 is more significantly enhanced compared to that of Graph 42 in FIG. 5.

EXAMPLE 5

I. Preparation of Au Nano-Particle Sol 4.12 mg of chloroauric acid ($AuCl_3 \cdot HCl \cdot 4H_2O$) was weighed and dissolved in 15.8 ml of deionized water; after the chloroauric acid was completely dissolved, 25 mg of PVP was weighed and dissolved in the aqueous chloroauric acid solution under magnetic stirring; 3.8 mg of sodium borohydride was weighed and dissolved in 10 ml of absolute ethanol to obtain 10 ml of ethanol solution of sodium borohydride in a concentration of $1 \times 10^{-2}$ mol/L; under magnetic stirring, with the amount ratio of the reducing agent to the metal ion being 4.2:1, 4.2 ml of ethanol solution of sodium borohydride of $4.2 \times 10^{-2}$ mol/L was added to the aqueous chloroauric acid solution, and the reaction was continued for 30 min to give 20 ml of Au nano-particles sol having $5 \times 10^{-4}$ mol/L of Au.

II. Preparation of Au Nano-Particle Doped Oxide Luminescent Material

With the volume ratio being 1:1, 16 ml of distilled water and 16 ml of absolute ethanol were thoroughly mixed, and 8 ml of above prepared Au nano-particle sol was added, thereby the Au content in the mixture was $1 \times 10^{-4}$ mol/L; the pH of the mixture was adjusted to 6 with nitric acid, then with the ratio of the amount of the metal to the TEOS being $6.67 \times 10^{-4}$:1, 0.006 mol of TEOS was quickly added, thereby the concentration of the TEOS in the solution was 0.2 mol/L, then it was stirred in water bath at 45° C. until a silica sol was formed, the resulted sol was marked as A5. With the ratio of the total amount of the $Gd^{3+}$ and $Eu^{3+}$ to the amount of TEOS being 3:1, the molar ratio of $Gd^{3+}$ to $Eu^{3+}$ being 0.93:0.07, 6.069 of $Gd_2O_3$ and 0.444 g of $Eu_2O_3$ were weighed and dissolved in concentrated nitric acid to obtain 15 ml of mixture containing $Gd(NO_3)_3$ and $Eu(NO_3)_3$, the total concentration of $Gd^{3+}$ and $Eu^{3+}$ in the resulted solution was 1.8 mol/L; the obtained mixture of $Gd(NO_3)_3$ and $Eu(NO_3)_3$ was added to the solution of the previously obtained A5, and the obtained mixture was magnetic stirred for 4 h, it was marked as B5; then with the oxalic acid being excess of 1.5 times, 5.106 g of oxalic acid was weighed and dissolved in 27 ml of deionized water to give an oxalic acid solution in the concentration of 1.5 mol/L, and the oxalic acid solution was added dropwise to the solution of the previously obtained B5, the time of the dropwise addition was 50 min, after the dropwise addition was completed it was magnetic stirred for another 5 h, the pH of the reaction system was adjusted to 11 with ammonia solution, then it was magnetic stirred for another 0.5 h, the obtained suspension was marked as C5; the C5 was washed with deionized water of 90° C. and filtered and repeated for three times, and the obtained filtered product was dried in an oven of 100° C. for 6 h; the dried material was calcined at 1250° C. for 5 hours, and the luminescent material with the composition of $2.79Gd_2O_3 \cdot SiO_2 \cdot 0.21Eu_2O_3 \cdot 6.67 \times 10^{-4}Au$ was obtained.

Figure 6:
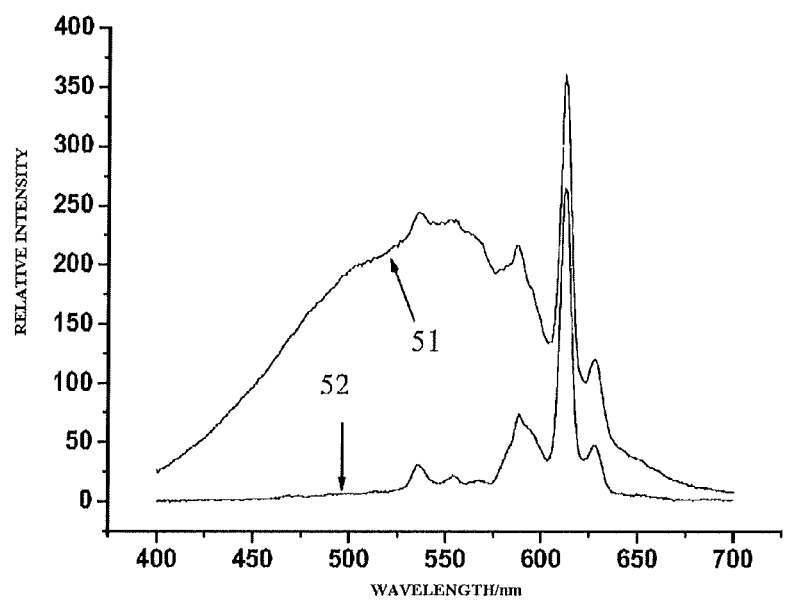
FIG. 6 shows a cathodoluminescence spectrum of the metal doped luminescent material of $2.79Gd_2O_3 \cdot SiO_2 \cdot 0.21Eu_2O_3 \cdot 6.67 \times 10^{-4}Au$ prepared in Example 5 stimulated by the cathode ray, and a cathodoluminescence spectrum of the non metal doped luminescent material of $2.79Gd_2O_3 \cdot SiO_2 \cdot 0.21Eu_2O_3$ prepared in the same process as that of Example 5 stimulated by the cathode ray, the test voltage in both spectra is 7 kV.

In FIG. 6, Graph 51 shows the cathodoluminescence spectra of the luminescent material of $2.79Gd_2O_3 \cdot SiO_2 \cdot 0.21Eu_2O_3 \cdot 6.67 \times 10^{-4}Au$ prepared in this Example stimulated by the cathode ray, the CIE values thereof are X=0.3308, y=0.4329, and the emitting light is yellow green light; while Graph 52 in FIG. 6 shows the cathodoluminescence spectra of the non metal doped luminescent material of $2.79Gd_2O_3 \cdot SiO_2 \cdot 0.21Eu_2O_3$ prepared by the same method as that in this Example stimulated by the cathode ray, the CIE values thereof are X=0.5505, y=0.4114, and the emitting light is red yellow. This figure shows that the light emitting of the luminescent material of Graph 51 is more significantly enhanced compared to that of Graph 52 in FIG. 6.

EXAMPLE 6

I. Preparation of Pd Nano-Particle Sol 0.53 mg of palladium chloride ($PdCl_2 \cdot 2H_2O$) was weighed and dissolved in 29.04 ml of deionized water; after the palladium chloride was completely dissolved, 15.0 mg of PVP was weighed and dissolved in the aqueous palladium chloride solution under magnetic stirring; 3.8 mg of sodium borohydride was weighed and dissolved in 10 ml of deionized water to obtain a reducing solution of sodium borohydride in $1 \times 10^{-2}$ mol/L; under magnetic stirring, with the amount ratio of the reducing agent to the metal ion being 3.2:1, 0.96 ml of aqueous sodium borohydride solution in $1 \times 10^{-2}$ mol/L was added to the aqueous palladium chloride solution, and the reaction was continued for another 20 min to give 30 ml of Pd nano-particles sol having $1 \times 10^{-4}$ mol/L of Pd.

II. Preparation of Pd Nano-Particle Doped Oxide Luminescent Material

With a volume ratio being 2:1, 12 ml of distilled water and 6 ml of absolute ethanol were thoroughly mixed, and 2 ml of above prepared Pd nano-particle sol was added, thereby the Pd content in the mixture was $1 \times 10^{-5}$ mol/L; the pH of the mixture was adjusted to 4 with nitric acid, then with the ratio of the amount of the metal to that of the TEOS being $5 \times 10^{-5}$:1, 0.004 mol of TEOS was quickly added, thereby the concentration of the TEOS in the solution was 0.2 mol/L, then it was stirred at room temperature of 25° C. until a silica sol was formed, the resulted sol was marked as A6. With the ratio of the total amount of the $Y^{3+}$ and $Eu^{3+}$ to the amount of TEOS being 2:1, the molar ratio of $Y^{3+}$ to $Eu^{3+}$ being 0.90:0.10, 1.626 g $Y_2O_3$ and 0.282 g $Eu_2O_3$ were weighed and dissolved in a concentrated nitric acid to obtain 10 ml mixture containing $Y(NO_3)_3$ and $Eu(NO_3)_3$, the total concentration of $Y^{3+}$ and $Eu^{3+}$ in the resulted solution was 0.8 mol/L; the obtained mixture of $Y(NO_3)_3$ and $Eu(NO_3)_3$ was added to the solution of the previously obtained A6, it was magnetic stirred for 3 h, the obtained mixture was marked as B6; then with the oxalic acid being excess of 1.3 times, 1.967 g of oxalic acid was weighed and dissolved in 31.2 ml of deionized water to give an oxalic acid solution in the concentration of 0.5 mol/L, and the oxalic acid solution was added dropwise to the solution of the previously obtained B6, the time of the dropwise addition was 60 min, after the dropwise addition was completed it was magnetic stirred for another 4.5 h, the pH of the reaction system was adjusted to 12 with ammonia solution, then it was magnetic stirred for another 0.5 h, the obtained suspension was marked as C6; the C6 was washed with deionized water of 100° C. and filtered and repeated for three times, and the obtained filtered product was dried in an oven of 110° C. for 4 h; the dried material was calcined at 1300° C. for 4 hours, and the luminescent material with the composition of $1.8Y_2O_3 \cdot SiO_2 \cdot 0.2Eu_2O_3 \cdot 5 \times 10^{-5}Pd$ Ag was obtained.

The embodiments above are merely the preferable embodiments of the present invention and not intended to limit the present invention. And all changes, equivalent substitution and improvements which come within the meaning and range of equivalency of the present invention are intended to be embraced therein.

What is claimed is:

1. An oxide luminescent material, comprising:
a luminescent substrate, an activator, and metal nano-particles,
wherein the activator and the metal nano-particles are doped in the luminescent substrate,
the chemical composition of the luminescent substrate is $aRe_2O_3 \cdot bSiO_2$, the activator is $Eu_2O_3$, and the chemical composition of the luminescent material is $aRe_2O_3 \cdot bSiO_2 \cdot cEu_2O_3 \cdot dM$,
wherein Re is Gd, Y or the combination thereof, M is a metal nano-particle,
wherein a ranges from 0.46-4.9, b is 1, c ranges from 0.04-0.21, and d ranges from $6.67 \times 10^{-4}$-$5 \times 10^{-3}$, and satisfies the relationship of a, b, c, and d is: (a+c): b=0.5-5, d: b=$5 \times 10^{-5}$-$5 \times 10^{-3}$, c: (a+c)=0.02-0.1.

2. The oxide luminescent material of claim 1, wherein the material of the metal nano-particles is one or more selected from the group consisting of Ag, Au, Pt, and Pd.

3. The oxide luminescent material of claim 1, wherein the particle size of the metal nano-particles is 5 nm-10 nm.

4. A preparation method of oxide luminescent material, comprising:
a metal nano-particle sol is obtained;
the metal nano-particle sol is added into a mixture of alcohol and water, the pH thereof is adjusted to 2-6, then a tetraethyl orthosilicate is added in such an amount that the ratio of the metal to the tetraethyl orthosilicate is in the range of $5 \times 10^{-5}$:1-$5 \times 10^{-3}$:1, and the mixture is stirred in water bath at the temperature of 25° C.-60° C. to obtain a mixed silica sol;
with the molar ratio of one or both selected from the group consisting of yttrium nitrate and gadolinium nitrate to europium nitrate being in the range of 0.98:0.02-0.9:0.1, a mixed nitrate solution is prepared, and the mixed nitrate solution is added into the mixed silica sol in such an amount that the ratio of total rare earth ions to tetraethyl orthosilicate is in the range of 0.5:1-5:1, after stirring, an oxalic acid solution is added dropwise, after another stirring, the pH is adjusted to 7-12, and the mixture is stirred to obtain an oxalate precursor solution;
the obtained oxalate precursor solution is filtered, washed and dried;
the dried product is calcined at 1000-1300° C. for 4-12 hours to obtain the oxide luminescent material with the chemical composition of $aRe_2O_3 \cdot bSiO_2 \cdot cEu_2O_3 \cdot dM$, wherein Re is Gd, Y or the combination thereof, M is a metal nano-particle, wherein a ranges from 0.46-4.9, b is 1, c ranges from 0.04-0.21, and d ranges from $6.67 \times 10^{-4}$-$5 \times 10^{-3}$ and satisfies the relationship of a, b, c, and d is: (a+c): b=0.5-5, d: b=$5 \times 10^{-5}$-$5 \times 10^{-3}$, c: (a+c)= 0.02-0.1.

5. The preparation method of oxide luminescent material of claim 4, wherein the metal nano-particle sol is obtained as follows:
a dissoluble solution of the metal compound is prepared;
a hydrazine hydrate, or ascorbic acid or alkali metal borohydride is dissolved in a solvent to give a reductant solution;
with stirring, an additive selected from at least one of the group consisting of polyvinyl pyrrolidone (PVP), sodium citrate, cetyl trimethyl ammonium bromide, sodium lauryl sulfate, and sodium dodecyl sulfate is dissolved in the dissoluble solution in such an amount that the content of the additive in the final metal nano-particle sol is in the range of $5 \times 10^{-4}$ g/ml-$4 \times 10^{-3}$ g/ml;
with stirring, and the ratio of reductant to the metal ions being 0.5:1-4.8:1, the dissoluble solution containing additives and the reductant solution are mixed, and the mixture is stirred for 10 minutes-45 minutes to give a metal nano-particle sol.

6. The preparation method of oxide luminescent material of claim 4, wherein the step of obtaining a mixed silica sol comprises:
an alcohol/water mixture is prepared, wherein the volume ratio of water:alcohol is 1:5-2:1; the obtained metal nano-particle sol is added into the alcohol/water mixture in such an amount that the concentration of metal in the mixture is in the range of $1 \times 10^{-5}$ mol/L-$1 \times 10^{-3}$ mol/L, the pH was adjusted to 2-6, then a tetraethyl orthosilicate was added in such an amount that the ratio of metal to tetraethyl orthosilicate is in the range of $5 \times 10^{-5}$:1-$5 \times 10^{-3}$:1, and the concentration of tetraethyl orthosilicate in the solution is in the range of 0.1 mol/L-0.5 mol/L, and the mixture is stirred in a water bath at a temperature of 25° C.-60° C. to give a mixed silica sol.

7. The preparation method of oxide luminescent material of claim 4, wherein the step of obtaining a mixed nitrate solution comprises:
a raw material of nitrate or an oxide of the corresponding rare earth element is dissolved in a concentrated nitric acid, and a mixed nitrate solution is prepared wherein the molar ratio of the total amount of one or both selected from the group consisting of yttrium nitrate and gadolinium nitrate to the amount of europium nitrate is 0.98: 0.02-0.9:0.1, and the concentration of total metal ions in the resulted mixed nitrate solution is 0.4 mol/L-1.8 mol/L.

8. The preparation method of oxide luminescent material of claim 4, wherein as the mixed nitrate solution is added to the mixed silica sol, the mixed nitrate solution and the mixed silica sol are mixed in such an amount that the ratio of the amount of metal ions to the amount of tetraethyl orthosilicate is in the range of 0.5:1-5:1, and the resulted mixture is stirred for 1-4 hours.

9. The preparation method of oxide luminescent material of claim 4, wherein the oxalate precursor solution is obtained as followings:
an oxalic acid solution with a concentration of 0.5-3 mol/L is added dropwise to a mixed system containing mixed nitrate solution and mixed silica sol, the dropwise addition time is controlled to be in the range of 20-60 minutes, after the dropwise addition is finished the resulted mixture is stirred for another 2-5 hours, then the pH of the reaction system is adjusted to 7-12, and it is stirred for another 0.5-2 hours to obtain the oxalate precursor solution.

10. The preparation method of oxide luminescent material of claim 4, wherein the metal nano-particle sol is one or more selected from the group consisting of Ag, Au, Pt, and Pd nano-particle sol.

* * * * *